United States Patent [19]

Beckerle et al.

[11] Patent Number: 4,473,488

[45] Date of Patent: Sep. 25, 1984

[54] PROCESS FOR RECLAIMING RARE-EARTH METALLIC OXIDE AND/OR RARE-EARTH METALLIC OXYSULFIDE PHOSPHORS

[75] Inventors: Heinz Beckerle, Aichwald; Volker Gerstle, Wendlingen; Gerhard Mauz, Köngen, all of Fed. Rep. of Germany

[73] Assignee: International Standard Electric Corporation, New York, N.Y.

[21] Appl. No.: 433,080

[22] Filed: Oct. 6, 1982

[51] Int. Cl.$^3$ .............................................. C09K 11/46
[52] U.S. Cl. ..................... 252/301.4 R; 252/301.4 S; 252/301.6 S; 423/21.1; 423/263
[58] Field of Search ................... 252/301.4 S, 301.6 S, 252/301.4 R; 423/21.1, 263

[56] References Cited

U.S. PATENT DOCUMENTS

| | | | |
|---|---|---|---|
| 2,796,331 | 6/1957 | Kauffman et al. | 423/447.3 |
| 3,378,345 | 4/1968 | Bourdeau et al. | 423/447.3 |
| 3,664,813 | 5/1972 | Hollander | 423/448 |
| 3,763,050 | 10/1973 | Dikhoff | 252/301.4 S X |
| 3,864,273 | 2/1975 | Forbes et al. | 252/301.4 S X |
| 3,941,714 | 3/1976 | Mathers | 252/301.4 S |
| 4,014,980 | 3/1977 | Fujimaki et al. | 423/448 |
| 4,391,787 | 7/1983 | Tibbetts | 423/447.3 |

FOREIGN PATENT DOCUMENTS

2442190 3/1976 Fed. Rep. of Germany ... 252/301.4 R 56-118913 9/1981 Japan .

OTHER PUBLICATIONS

Oberlin et al., J. Of Crystal Growth, V 32, pp. 335–349 (1976).
Koyama et al., Japanese Journal of Applied Physics, vol. 11, No. 4 (Apr. 1972) pp. 445–449.
Katsuki et al., Carbon, vol. 19, pp. 148–150, (1981).

*Primary Examiner*—Jack Cooper
*Attorney, Agent, or Firm*—Donald J. Lenkszus

[57] ABSTRACT

To a suspension of rare-earth phosphors and sulfidic or selenidic phosphors there is added about 1 to 2% of the amount of hypohalogenite which would be necessary to convert the entire sulfidic or selenidic chalcogenide phosphor into a soluble sulfate and/or selenate. When acidifying the dispersion to which hypohalgenite has been added, to a pH value of preferably between 1.5 and 2, a sedimentation of elementary sulphur and/or selenium forms and becomes attached to the sulfidic and/or selenidic phosphor solids, thus causing these phosphor solids to form sediment. The supernatant suspension containing the rare-earth phosphor is then decanted, and the rare-earth phosphor is reclaimed from the suspension.

The disclosed reclaiming process is particularly suitable for decontaminating phosphor mixtures for use in manufacturing color television cathode-ray tubes.

2 Claims, No Drawings

PROCESS FOR RECLAIMING RARE-EARTH METALLIC OXIDE AND/OR RARE-EARTH METALLIC OXYSULFIDE PHOSPHORS

The invention relates to a process for reclaiming rare-earth metallic oxide and/or rare-earth metallic oxysulfide phosphors from a phosphor mixture which, contains at least one chalcogenide phosphor, i.e., a sulfide and/or selenide of zinc and/or cadmium, by suspending the mixture in water, mixing with a hypohalogenite and acidifying the suspension.

Such a process is known (DE-AS 24 42 190). Luminescent phosphors of this kind are used in the manufacture of color cathode-ray tubes. As a rare-earth metallic oxide phosphor there is chiefly used europium-activated yttrium oxide, and as a rare-earth metallic oxisulfide phosphor there is chiefly used a europium-activated yttrium oxysulfide. These red emitting phosphors are referred to as rare-earth phosphors. As green or blue emitting phosphors there are generally used e.g., zinc sulfide, zinc cadmium sulfide, zinc sulfide-zinc selenide (ZnS, $Zn_{1-x}Cd_xS$, $ZnS_{1-y}ZnSe_y$) each doped with special metals. Phosphors of this type are referred to as chalcogenide phosphors.

It is well known that sulfides or selenides, by being treated with hypohalogenite, can be changed into sulfates or selenates. In the process for reclaiming rare-earth phosphors this property is utilized for changing the chalcogenide phosphors into soluble sulfates and/or selenates, in order to separate the rare-earth phosphors. In the prior art processes, the sulfides or selenides are quantitively converted into sulfates or selenates respectively. Owing to the necessary quantitative conversion, the prior art process, with a view to the amount of chemicals to be used, to have disadvantages in cases where the proportion of rare-earth phosphors to the amount of chalcogenide phosphors is small. In these cases a great amount of chalcogenide phosphor must be dissolved in order to be able to separate the small amount of the rare-earth phosphor.

It is the object of the invention to provide a process for reclaiming rare-earth phosphors from a mixture thereof with chalcogenide phosphors which requires the use of a smaller amount of hypohalogenite than in the prior art process.

According to the invention, this object is achieved in that at first, to the phosphor suspension, there is added approximately 1 to 2% of the amount of hypohalogenite which would be necessary for converting the entire existing chalcogenide phosphor into a sulfate and/or selenate, that thereafter the suspension is acidified up to a pH value ranging between 1 and 6.5, so that elementary sulphur and/or selenium results which adds on to the chalcogenide phosphor solids causing these phosphor solids to sediment, that subsequent to the sedimentation, the excessive aqueous rare-earth phosphor suspension is decanted and from this the rare-earth phosphor is centrifuged, washed and, thereafter dried.

Accordingly, the process proposed by the invention only requires the addition of one to two percent of the amount of hypohalgenite which would have to be added if the prior art process were to be used. The advantage of the invention, however, not only resides in this saving of chemicals, but also that the heavy metals contained in the chalcogenide phosphor are chiefly maintained in unsoluble form, so that they can be easily removed and safely deposited. This process poses less problems from an environmental point of view, than with the prior art process where the chalcogenide phosphors are changed into water-soluble compounds.

Oxidation of the chalcogenide ions to form sulphur and/or selenium takes place within a pH range extending from 1 to 6.5, with the process occurring more quickly the lower the pH value. Of course, below pH 2 there also takes place an unwanted gradual oxidation to form sulfate and/or selenate which, becomes greater as the pH value becomes smaller. An optimum between speed and the desired effect of the reaction lies in a pH range between about 1.5 and 2. The acidification is carried out preferably with the aid of a mineral acid, such as nitric acid.

The invention will now be explained in greater detail with reference to an example of embodiment. It is assumed that the phosphor mixture contains further contaminants as is normally the case with color phosphor mixtures which, in color picture tube production, are found as sediments in faceplate panel effluent channels.

A contaminated phosphor suspension is first sieved by being passed through a screen whose apertures have diameters of about 100 $\mu$m, by which coarse foreign objects are removed. Remainders of water-soluble substances, such as ammonium dichromate or polyvinyl alcohol are then washed out. The then still existing solid constituents are heated to a temperature of approximately 450° C., in the course of which organic constituents either burn or volatilize. After these steps, there chiefly only remains the mixture of rare-earth phosphors and chalcogenide phosphors freed of contaminants.

For representing the quantitative proportions, it be assumed that as a chalcogenide phosphor there exists a doped zinc sulfide, and that per 100 g zinc sulfide there exist 10 g rare-earth color phosphors.

Into a beaker having a capacity of one liter, there is filled 110 g of the heated phosphor mixture which thus contains 100 g zinc sulfide. The mixture is mixed with 0.75 liter of water. To the suspension obtained by stirring, there is then added with continued agitation 30 g of an aqueous solution containing 13 percent sodium hypochlorite by weight. Accordingly, a total 3.9 g of sodium hypochlorite is added to 100 g of zinc sulfide. This corresponds to about 1.3% of the amount which would have to be added in order to convert the entire 100 g of zinc sulfide into water-soluble zinc sulfate. 304 g of sodium hypochloride per 100 g of zinc sulfide would be required for a full conversion.

To the suspension there is added nitric acid in concentrated form and in such an amount until a pH value ranging between 1.5 and 2 is reached.

After a short period of time following a continued agitation, elementary sulphur is separated. This sulfur becomes attached to the zinc sulfide phosphor solids. The zinc sulfide phosphor solids agglomerate on the elementary sulphur as sediment in spite of the agitation while the rare-earth phosphor remains suspended. With the aid of an ultraviolet lamp, this process of sedimentation process, is monitored and, upon termination of the sedimentation the excessive suspension containing the rare-earth phosphor, is decanted. From this suspension, the rare-earth phosphor is separated by being centrifuged and is then washed three or four times. One liter of demineralized water is used for each wash and each wash is thereafter dried at a temperature of 120° C.

Accordingly, in distinction to all prior art processes for reclaiming rare-earth color phosphors, in the process disclosed by the present invention the simultaneously existing chalcogenide phosphor is not converted to a soluble form, but the course of the process is so designed that there will only result sulphur which, as has been proved, serves as a fluocculating agent for the chalcogenide phosphors.

The process is still fully effective when adding only approximately 1% of the amount of hypochlorite which would be necessary for converting the entire amount of existing chalcogenide phosphor into a soluble sulfate or selenate. Preferably, there is added an amount ranging between about 1.5 to 2% of hypochlorite required according to the prior art process, because then the process as proposed by the invention is particularly safe and quick. The amount of hypochlorite to be added is anyway not restricted towards above, but the advantages of the proposed process are increasingly lost the more hypochlorite is added in excess of the required minimum amount.

We claim:

1. A process for reclaiming rare-earth metallic oxide and/or rare-earth metallic oxysulfide phosphors from a phosphor mixture which contains at least one chalcogenide phosphor, the steps comprising:
(a) suspending the mixture in an aqueous suspension;
(b) adding to the suspension approximately 1 to 2% of the amount of hypohalogenite which would be necessary to convert the entire chalcogenide phosphor into a sulfate and/or selenate;
acidifying the suspension to a pH value ranging from 1 to 6.5 to effect formation of elementary sulfur and/or selenium and the sedimentation therewith of the chalcogenide phosphur
(d) decanting the acidified aqueous suspension; (e) centrifuging the decanted suspension to separate the rare-earth metallic oxide and/or rare-earth metallic oxysulfide phosphors; and (f) washing and drying the so separated phosphors.

2. The process as claimed in claim 1, in which the step of acidifying is performed at a pH value ranging from 1.5 to 2.

* * * * *